United States Patent [19]

Komiya et al.

[11] Patent Number: 4,633,155
[45] Date of Patent: Dec. 30, 1986

[54] NUMERICAL CONTROL SYSTEM

[75] Inventors: Hidetsugu Komiya; Mitsuo Kurakake, both of Hino, Japan

[73] Assignee: Fanuc Ltd., Minamitsuru, Japan

[21] Appl. No.: 783,815

[22] PCT Filed: Nov. 18, 1981

[86] PCT No.: PCT/JP81/00342

§ 371 Date: Aug. 23, 1982

§ 102(e) Date: Aug. 23, 1982

[87] PCT Pub. No.: WO82/02259

PCT Pub. Date: Jul. 8, 1982

Related U.S. Application Data

[63] Continuation of Ser. No. 413,335, Aug. 23, 1982.

[30] Foreign Application Priority Data

Dec. 26, 1980 [JP] Japan .................. 55-188766

[51] Int. Cl.$^4$ ............................................. G05B 1/06
[52] U.S. Cl. ................................. 318/640; 250/552
[58] Field of Search ............... 318/640, 567; 250/227, 250/552

[56] References Cited

U.S. PATENT DOCUMENTS

| | | | |
|---|---|---|---|
| 3,872,368 | 3/1975 | Friberg et al. ............... | 318/567 |
| 3,919,561 | 11/1975 | Coberly ....................... | 250/227 |
| 4,117,460 | 9/1978 | Walworth et al. ........... | 318/640 X |
| 4,151,451 | 4/1979 | Maertins et al. ............ | 318/640 X |
| 4,161,651 | 7/1979 | Sano et al. . | |
| 4,293,805 | 10/1981 | Warner ....................... | 318/640 X |
| 4,310,754 | 1/1982 | Check, Jr. .................. | 250/227 X |
| 4,379,289 | 4/1983 | Peek ........................... | 250/227 X |
| 4,424,569 | 1/1984 | Imazeki et al. ............. | 318/567 X |

FOREIGN PATENT DOCUMENTS 54-149409 11/1979 Japan .

Primary Examiner—B. Dobeck
Attorney, Agent, or Firm—Staas & Halsey

[57] ABSTRACT

A numerical control system in which data signals are exchanged between a computer processing device MPU and each function block through an address bus ABUS and a data bus DBUS. Parallel electric signals are converted into serial signals by shift registers SHR$_1$ and SHR$_2$, and are converted into light signals by transmitters Tx$_{11}$ and Tx$_{12}$. The light signals are delivered to pulse distributors PDN through optical fiber cables OF$_1$ and OF$_2$ and these light signals are converted back to electric signals by receivers Rx$_3$ and Rx$_4$ and are further converted into parallel signals by shift registers SHR$_3$ and SHR$_4$. The parallel signals are delivered to a pulse distributor PD as position signals in the directions of X, Y and Z axes thereby to driving servomotors.

2 Claims, 4 Drawing Figures

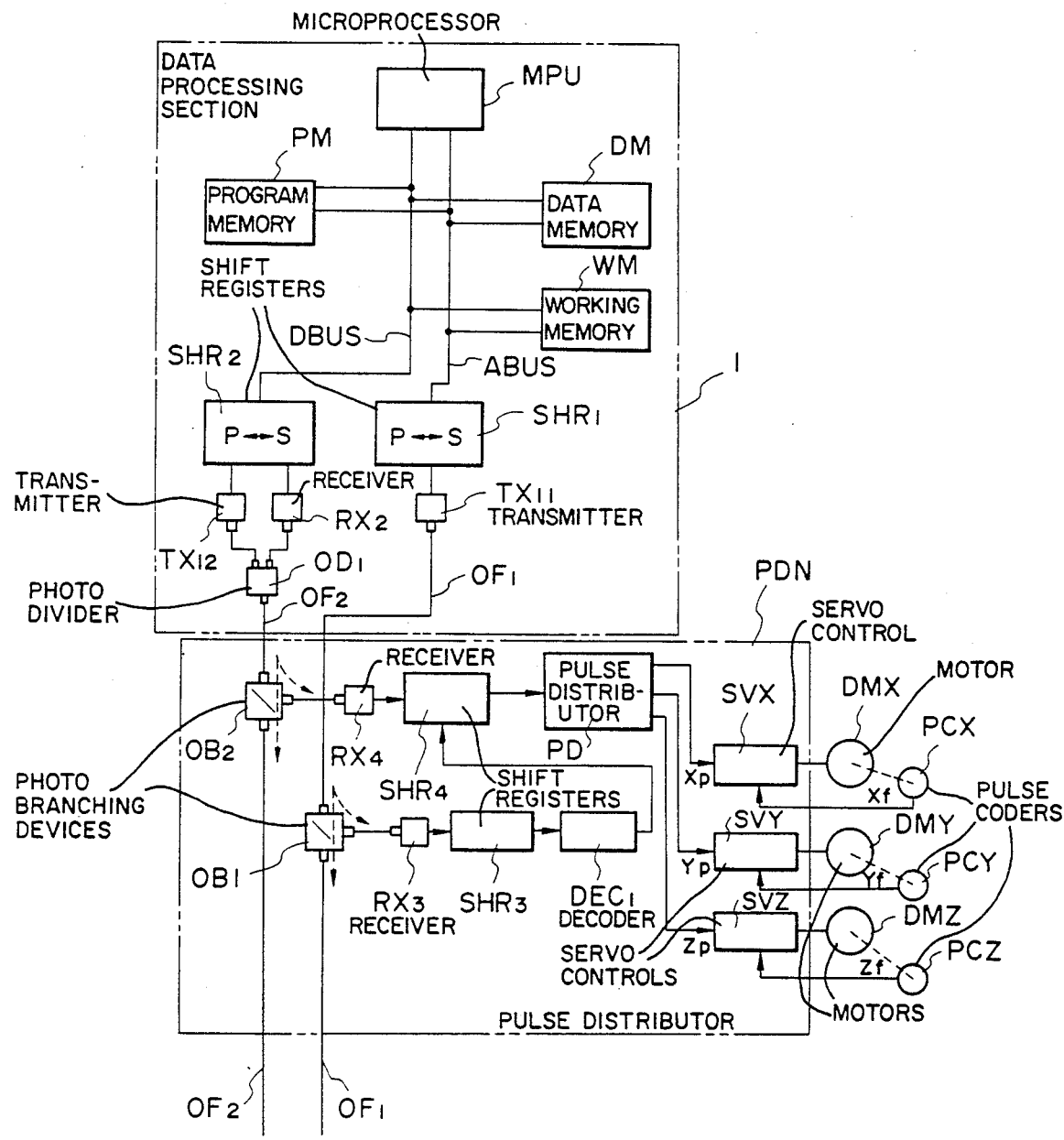

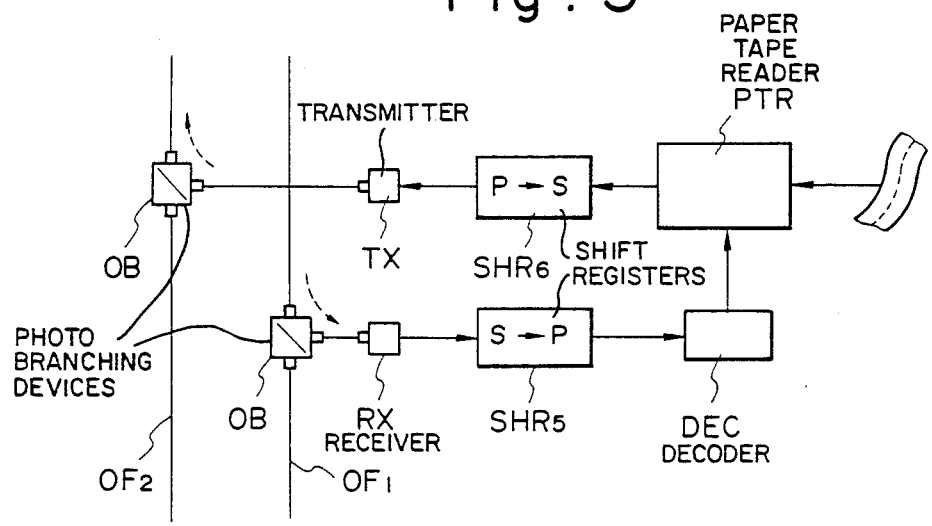
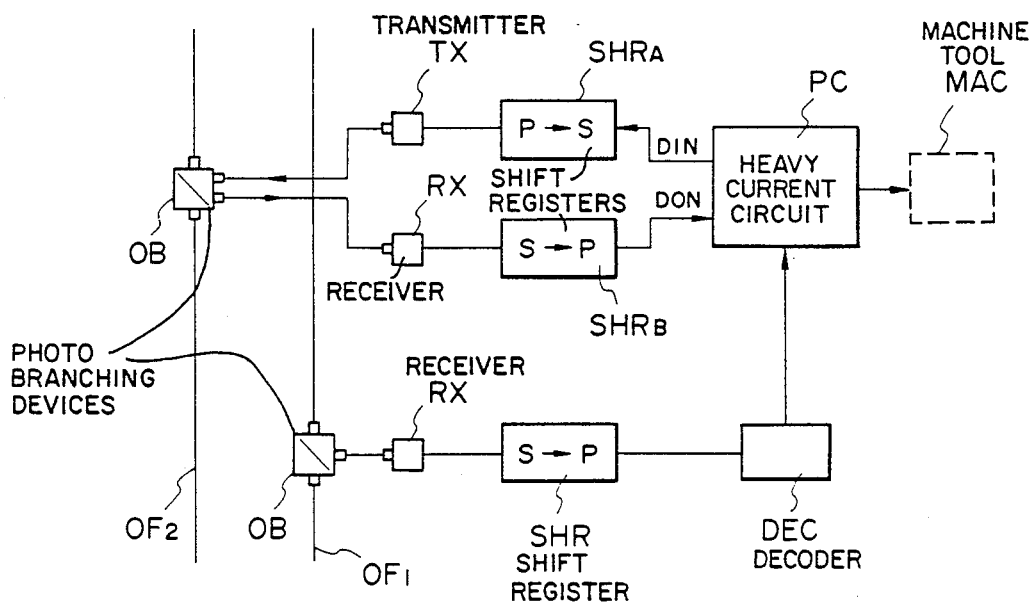

NUMERICAL CONTROL SYSTEM

This is a continuation of co-pending application Ser. No. 413,335 filed on Aug. 23, 1982.

BACKGROUND OF THE INVENTION

The present invention relates to a numerical control system for controlling various machines such as wire-cut electrospark machine, turret punch press, composite machine tool and so forth and, more particularly, to a numerical control system in which various functions are coupled by means of optical fibers.

Most current numerical control systems (referred to as "NC system", hereinafter) incorporate computers. More specifically, these NC systems have the following constituent elements: a processing device such as a microprocessor adapted to perform various processings such as numerical control processing, edit processing, transmission and receiving of data and so forth, in accordance with a control program and a machining program; memories such as a nonvolatile data memory, a working memory and a control program memory; a paper tape reader and a paper tape puncher; a control panel incorporating a display device; an external storage medium such as cassette type magnetic tape; and a heavy current circuit for signal exchange between the controller and the machine, e.g. delivery of signals, such as a miscellaneous function command or a spindle rotation command, to the machine and delivery of work completion signals to the controller upon confirming the completion of the work in response to the miscellaneous function command or the spindle rotation command. The NC system further includes servomotor units having driving motors for positioning the spindle in the directions of X,Y and Z axes, and a pulse distributor for distributing pulses to these servo units.

In these known NC systems, the exchange of data between different functional blocks (for example, paper tape reader and microprocessor) in the system is made through a data bus, while the delivery of the address is made through an address bus. As a matter of fact, in order to concurrently send signals comprising n bits constituting each unit of data, each data bus includes n lines, so that the connection of bus lines between associated functional blocks is very complicated. In addition, since the NC systems are usually used in factories or the like where there is a lot of electrical noise, the address bus often and the data bus tend to pick up the electrical noise resulting in a malfunction of the NC system. Another problem of the prior art is that a specific consideration or measure is required to standarize the interface between associated functional blocks which raises the cost of the NC system.

SUMMARY OF THE INVENTION

In order to obviate these problems of the prior art, according to the invention, there is provided a numerical control system in which the data processing section is connected to various functional blocks by means of buses comprising optical fibers, and the data is transmitted in the form of serial light signals through these data buses comprising the optical fibers. More specifically, each functional block is provided with a shift register for converting parallel signals into serial signals, a transmitter converting the output signal from the shift register into a light signal and to transmitting the light signal to the optical bus through a photo branching device, a receiver for converting the light signal coming from the photo branching device into an electric signal, and a shift register for converting the serial output from the receiver into a parallel signal. Thus, according to the invention, the data processing section and each functional block are connected by a data bus comprising an optical fiber cable and the exchange of the data between the data processing section and each functional block is made through this data bus comprising by the optical fiber.

Thus, the present invention provides a compact NC system which can perfectly eliminate the pick up of electrical noise by the bus lines.

BRIEF DESCRIPTION OF THE DRAWINGS

FIG. 2 is a circuit block diagram of an NC system constructed in accordance with an embodiment of the invention;

FIG. 3 is a circuit block diagram of a tape reader; and

FIG. 4 is a circuit block diagram of a heavy current circuit.

DESCRIPTION OF THE PREFERRED EMBODIMENT

Figure 1:
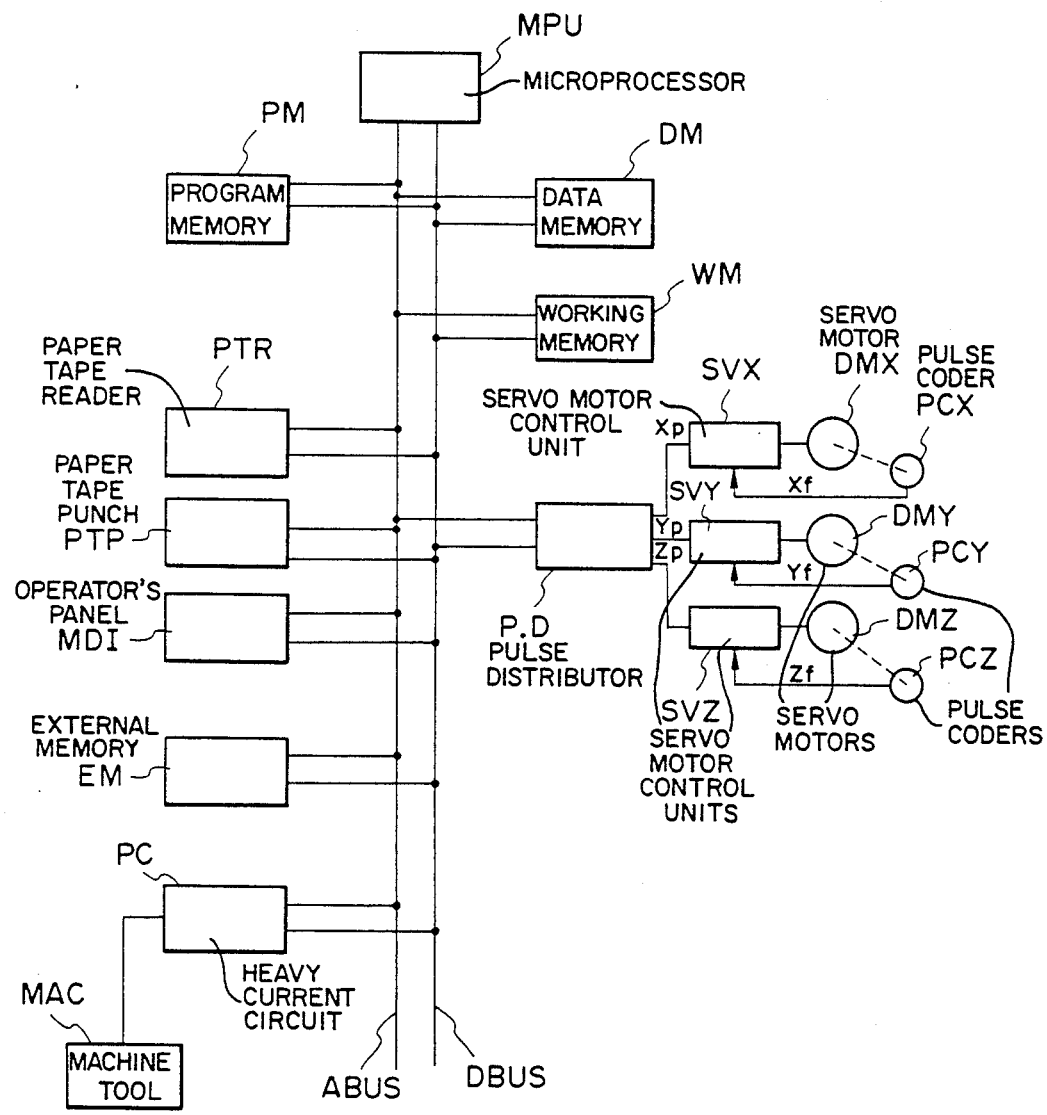
FIG. 1 is a circuit block diagram of a conventional NC system.

The invention will be described in more detail hereinafter with reference to the accompanying drawings in comparison with the prior art.

FIG. 1 is a schematic circuit block diagram of a conventional NC system incorporating a computer. In the drawings, a symbol MPU represents a processing unit such as a microprocessor, adapted to perform various processings such as numerical control processing, edit processing, transmission and receiving of signals and so forth, in accordance with a control program and a processing program. A nonvolatile data memory DM is adapted to store various processing data for controlling a machine tool. A working memory WM is composed a volatile random access memory having a high speed and a small capacity and is adapted to temporarily store the machining data read out from the data memory DM. A control program memory PM is adapted to store the control program, whle a pulse distributor PD performs a known pulse distribution operation to distribute pulses $Xp, Yp$ and $Zp$ upon receipt of position commands X,Y and Z.

Servo control circuits SVX,SVY and SVZ produce, upon receipt of the distribution pulses $Xp, Yp$ and $Zp$, as well as feedback pulses $Xf, Yf$ and $Zf$ which are produced each time the rotation of the driving motors reachs a predetermined value, analog voltages proportional to $|Xp-Xf|$, $|Yp-Yf|$ and $|Zp-Zf|$. The driving motors for driving the spindle in the directions of X,Y and Z axes are represented by DMX,DMY, and DMZ, respectively. Pulse coders PCX,PCY and PCZ attached to the shafts of the driving motors DMX,DMY and DMZ produce the aforementioned feedback pulses $Xf, Yf$ and $Zf$ each time the rotation of the motor shafts reaches a predetermined value. The servo control circuits SVX,SVY and SVZ, D.C. motors DMX,DMY and DMZ and the pulse codes PCX,PCY and PCZ in combination constitute respective servo units which perform servo control to nullify the voltages $|Xp-Xf|, |Yp-Yf|$ and $|Zp-Zf|$, respectively. A paper tape reader PTR is adapted to read numerical control information (machining data) punched in a paper tape and to store the same in the data memory DM. A paper tape puncher PTP is adapted to punch a paper tape in accordance with the machining data stored in the data memory DM, thereby storing the machining data in the paper tape which is an external storage medium. A symbol MDI represents an operation panel which incorporates a display device, while a symbol EM represents an external memory medium such as a cassette type magnetic tape or a cassette type magnetic bubble memory. A symbol PC represents a heavy current circuit through which signals are exchanged between the NC system and a machine tool MAC. Namely, the heavy current circuit PC delivers to the machine tool MAC a signal DON representing a miscellaneous function (M function) and a spindle rotation function (S function) as a contact signal, and, as the machine tool accomplishes the operation in response to the miscellaneous function command or the spindle rotation command, the heavy current circuit produces a completion signal DIN. Address buses for transferring the address signals and the data buses for transferring various data are represented by ABUS and DBUS, respectively.

In the conventional NC system explained above, the exchange of data between associated functional blocks is made through the data bus DBUS, while the exchange of the address signals is made through the address bus ABUS. Actually, however, each bus consists of n lines in order to concurrently transmit the signals of n bits constituting each unit of data. In consequence, the wiring of bus lines is very complicated.

These problems, however, are completely overcome by the present invention.

FIG. 2 shows a circuit block diagram of an NC system constructed in accordance with an embodiment of the invention, in which the same reference symbols are used to represent the same parts as those in the conventional system explained before.

Referring to FIG. 2, a reference numeral 1 denotes a data processing section which includes, as in the case of the data processing section of the conventional system, a processing unit MPU, control program memory PM, data memory DM and working memory WM. These functions are connected through address bus ABUS and data bus DBUS of 8 or 16 bits. A shift register $SHR_1$ is adapted to convert the parallel address signal of (n+1) bits delivered through the address bus ABUS, i.e. signals $b_o$ to $b_n$ delivered parallelly at one time, into a serial bit signal starting from the bit $b_o$ and ending in the bit $b_n$. A transmitter $Tx_{11}$ represents a transmitter which converts the electric serial address signal coming from the shift register $SHR_1$ into a light signal and to transmits the thus obtained light signal. For instance, the transmitter $Tx_{11}$ comprises an LED or a semiconductor laser. A symbol $OF_1$ represents an optical fiber cable comprising the address bus. A shift register $SHR_2$ is adapted to convert the parallel data signal of (n+1) bits coming through the data bus DBUS, i.e. the signals $b_o$ to $b_n$ delivered concurrently, into a serial bit signal starting from $b_o$ and ending in $b_n$. A transmitter $Tx_{12}$ is adapted to convert the electric serial bit signal delivered by the shift register $SHR_2$ into a light signal. A symbol $OF_2$ represents an optical fiber cable for the exchange of the data signals. A photo divider $OD_1$ is adapted to transmit the light signal delivered thereto by the transmitter $Tx_{12}$ to the optical fiber cable $OF_2$ and to transmit the light signal delivered thereto by the optical fiber cable $OF_2$ to the receiver $RX_2$.

A symbol PDN represents a pulse distributor. The pulse distributor PDN includes a photo branching device $OB_1$ which divides and receives the light signal from the optical fiber cable $OF_1$ serving as the address bus, and a photo branching device $OB_2$ adapted to divide and receive the light signal from the optical fiber cable $OF_2$ serving as the data bus. A receiver $Rx_3$ is adapted to receive the serial bit signal from the photo branching device $OB_1$ and to convert the same into an electric pulse signal. A shift register $SHR_3$ converts the electric serial bit signal delivered thereto by the receiver $Rx_3$ into a parallel bit signal. A decoder $DEC_1$ decodes the address signal coming from the shift resistor $SHR_3$ and produces an enable signal. A receiver $Rx_4$ receives the serial bit light signal from the photo branching device $OB_2$ and converts the same into an electric pulse signal. A reference symbol $SHR_4$ represents a shift register adapted to convert the electric serial bit signal delivered thereto by the receiver $Rx_4$ into a parallel bit signal. The shift register delivers to the pulse distributer the parallel data signals representing the position commands in X,Y and Z directions.

In the NC system of the invention, the functional block which is adapted only to receive the data signal from the data processing section 1 but not to transmit the data to the processing section 1, e.g. the tape puncher, may be provided simply with a mechanism including photo branching devices disposed in the optical fiber cable $OF_1$ serving as the address bus and the optical fiber cable $OF_2$ serving as the data bus, receivers for receiving the signals from the photo branching devices and converting the serial light signals into serial electric signals and shift registers for converting the serial electric signals into parallel electric signals, as in the case of the pulse distributor.

FIG. 3 is a functional block diagram showing a tape reader which is one of the functional blocks adapted to perform only the transmission of the read data in accordance with the instructions given by the data processing section 1. Optical fiber cables $OF_1$ and $OF_2$ are provided with respective photo branching devices OB. Symbols Tx and Rx represent transmitters and receivers, respectively. The photo branching devices OB, transmitters Tx and the receivers Rx are materially identical to those explained before, so that a detailed description thereof is omitted. A shift register $SHR_5$ is adapted to convert a serial signal into a parallel signal, while another shift register $SHR_6$ is adapted to convert the parallel signal into the serial signal. The arrangement is such that the address signal which is a signal light signal derived from the optical fiber cable $OF_1$ is branched by the photo branching device OB and is converted into an electric signal by the receiver Rx. The electric signal is then changed by the shift register $SHR_5$ into a parallel address signal which in turn is delivered to the decoder DEC. On the other hand, the parallel electric signal read by the tape reader is converted by the shift register $SHR_6$ into a serial electric signal which in turn is converted into a light signal by the transmitter Tx. The light signal is then forwarded from the photo branching device OB to the optical fiber cable $OF_2$ and is fed to the data processing section 1. In the NC control system of the invention, the functional block adapted only to send the data to the processing section 1 but not to receive data from the processing unit 1, e.g. control panel, may simply be provided with a transmitter for converting the electric signal into light signal, as in the case of the paper tape reader.

FIG. 4 is a functional block diagram of a heavy current board which is a functional block adapted to transmit and receive data in accordance with the instructions given by the data processing section 1. The heavy current board includes a transmission device and a receiving device connected between the heavy current circuit PC and the optical fiber cable $OF_2$ serving as the data bus. The transmission device comprises the transmitter Tx and a shift register $SHR_A$ for converting the parallel signal into a serial signal, while the receiving device comprises the receiver Rx and a shift register $SHR_B$ for converting the serial signal into a parallel signal. The receiving device is adapted to deliver to the heavy current circuit PC various signals DON such as the miscellaneous function (M function) command, the spindle rotation function (S function) command and the tool selection function (T function) command forwarded from the data processing section 1. The transmission device is adapted to receive, as the machine tool completes the work in response to the command such as miscellaneous function command, spindle rotation command and the tool exchange command, a completion signal DIN from the heavy current circuit PC, and delivers the same through the photo branching device OB to an optical fiber cable $OF_2$ functioning as the data bus.

This arrangement can be applied to other functional blocks which perform, as in the case of the heavy current circuit mentioned above, both the transmission and reception of the data, e.g. a data transmitter/receiver connected to a robot controller.

The NC system of the described embodiment have two independent buses: namely, a data bus and an address bus. Needless to say, however, this arrangement is not exclusive and the arrangement may be modified to make common use of a single bus for both the data signal and address signal, in such a manner that, after delivering the address signal to the common bus in a bit serial form, the data signal is transferred through the common bus. Such a modification reduces the number of the transmitters and receivers almost to a half of those in the conventional system.

As will be realized from the foregoing detailed description, according to the invention, it is possible to remarkably simplify the bus arrangement as compared with the conventional system and to construct the functional blocks in the form of modules, thanks to the use of optical fiber cables for the data transfer. In consequence, the size of the circuit of the central data processing section is made small enough to permit the mounting of the central data processing section on a part of the machine tool in a compact manner, which in turn permits a reduction of the size of the machine tool. The use of the optical fiber cable permits a high speed data transfer, while eliminating the attenuation of the signal or the influence of noise which may be caused when the length of the bus is increased. The high speed data transfer on the other hand makes it possible to transfer the data in the bit serial form without a substantial increase in the processing time as compared with the conventional system in which the data signals are transferred in a bit parallel manner through bus lines made of electric conductors. The use of the optical fiber cables does not raise the cost of the NC system substantially, since the number of elements necessary for the optical fiber data transfer, e.g. transmitters, receivers, connectors and so forth, is not so large because only one or two buses are necessary. Furthermore, it is possible to standarize the interface by arranging the components such that various functional blocks in the NC system are coupled by a common bus. Thus, the present invention offers various advantages which could never be attained by the conventional NC systems.

What is claimed is:

1. A numerical control system for controlling a machine, comprising:

a data processing section for processing data signals;

a bus comprising an optical fiber cable operatively connected to said data processing section, said bus transferring therethrough the data signals in the form of bit serial light signals; and functional block means, operatively connected to said bus, for controlling the machine in dependence upon the data signals from said data processing section, comprising:

a photo branching device operatively connected to said optical fiber cable;

a receiver, operatively connected to said photo branching device, for converting the bit serial light signals delivered thereto by said photo branching device into a serial electric signal; and a shift register, operatively connected to said receiver, for converting the serial electric signal delivered by said receiver into a parallel electric signal.

2. A numerical control system for control of a machine, comprising:

a data processing section for processing data signals;

a bus comprising an optical fiber cable, operatively connected to said data processing section of said numerical control system, for transferring therethrough the data signals in the form of bit serial light signals; and functional block means for controlling the machine in dependence upon the data signals from said data processing section, comprising:

a first shift register for converting a first parallel electric signal into a first serial electric signal;

a transmitter, operatively connected to said shaft register, for converting the first serial electric signal coming from said shift register into a serial light signal;

a photo branching device, operatively connected to said optical fiber cable and said transmitter, for transmitting the serial light signal to and from said bus through said photo branching device;

a receiver, operatively connected to said photo branching device, for converting the serial light signal derived from said photo branching device into a second serial electric signal; and a second shift register, operatively connected to said receiver, for converting the second serial electric signal delivered thereto by said receiver into a second parallel electric signal.

* * * * *